(12) United States Patent
Kulatunge et al.

(10) Patent No.: US 6,353,902 B1
(45) Date of Patent: Mar. 5, 2002

(54) NETWORK FAULT PREDICTION AND PROACTIVE MAINTENANCE SYSTEM

(75) Inventors: Anurudha Kulatunge, Richardson; Kalyan Basu, Plano; Hee C. Lee, Plano; Meenakshi Prakash, Plano, all of TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/337,209

(22) Filed: Jun. 8, 1999

(51) Int. Cl.[7] .................................................. G06F 11/00
(52) U.S. Cl. ............................ 714/712; 714/47; 714/48
(58) Field of Search ........................... 714/47, 48, 712; 370/242

(56) References Cited

U.S. PATENT DOCUMENTS 6,012,152 A * 1/2000 Douik et al. .................. 714/26
6,252,852 B1 * 6/2001 Rowles et al. ............... 370/242

* cited by examiner

Primary Examiner—Phung M. Chung
(74) Attorney, Agent, or Firm—John D. Crane; Bracewell & Patterson, L.L.P.

(57) ABSTRACT

A system for proactive maintenance of a telecommunications network. A database is created containing characteristics of a plurality of valid logs. These valid logs represent alarms within a network which report status and abnormalities in the network and which have been specifically selected by a network domain expert or administrator from a larger group of logs. The characteristics correspond to a pattern of network fault parameters. The network is monitored for occurrences of a valid log. When a valid log is encountered, future occurrence of a fault is predicted based on an analysis of the valid log and the characteristics found in the database. Corrective measures are taken to prevent the fault from occurring.

25 Claims, 5 Drawing Sheets

NETWORK FAULT PREDICTION AND PROACTIVE MAINTENANCE SYSTEM

BACKGROUND OF THE INVENTION

1. Technical Field

The present invention relates in general to an improved telecommunications networks, and in particular to a method and system for fault prevention in telecommunications network. Still more particularly, the present invention relates to a method and system for fault prediction and proactive maintenance in a telecommunications network.

2. Description of the Related Art

In a highly competive market, there is a demand for highly reliable networks and networks that are easy to monitor. This includes the detection of faults in real-time or near real-time with minimal manual intervention.

Modern telecommunications networks are growing fast in both size and complexity. A Network Alarm correlation system improves network reliability through network surveillance and fault management. Traditionally, alarms (also referred to as logs and utilized interchangeably throughout this document) report status and abnormalities in the network to the Network Operations Centers (NOC) manned by network domain experts. These alarms are generated by the Network Elements (NE). NEs produce thousands of alarms a day, where a single failure often generates multiple alarms and the same alarm may be raised by different failures. Currently, a burst of alarms during a major network failure may exhibit 40–50 alarms per second. These alarms that are provided to protect the network, due to its sheer volume, may cause network operators to overlook alarms unnoticed, notice them too late, and incorrectly interpret groups of alarms, which results in frequent and undetected network failures. Thus, the task of network failures, faults and surveillance is very difficult. Added to this is the ever increasing number of alarms introduced to the system by new software loads.

Previously, when network maintenance was entirely dependent on network domain experts, all network logs flowed directly to the NOC. As the network growth increased exponentially, so did the number of logs flooding to the NOCs. Due to the frequent inability to foresee the failures, NOC staff operates in a reactive mode to failures already occurred, rather than being in a proactive mode to contain failures in their initial stages. Such frequent network failures affect the revenues of service providers and results in low customer satisfaction. Thus, the task of identifying the faults and correcting them before it is too late is a critical task of network management.

The currently available tools for log detection are nodal management tools. These tools often can not perform root cause analysis or prediction, lack the capability to predict faults, require manual monitoring of the network, and are reactive in nature.

The International Telecommunications Union (ITU) has a five-layered model known as Telecommunications Management Network (TMN) put forth to address this problem. TMN includes (1) the business management layer, (2) the service management layer, (3) network management (NM) layer, (4) element management (EM) layer and (5) the network element (NE) layer.

Fault prediction applications exist for the EM layer and NE layer which are vendor-specific. The NM layer is the domain of the equipment manufacturer and because of this it is difficult to integrate multi-vendor products.

Faults in the NM layer are due to the impact of external factors that could be in the form of busy hour traffic, cable cut during road construction, microwave link failure due to bad weather, etc. A failure results in network downtime, loss of revenue to service provider, and reduction of customer satisfaction. Thus, the task of identifying these and other faults and correcting them before it is too late is a critical task of network management.

With this backdrop of a chaotic network management structure, calls for equipment vendors to be more proactive to resolving these issues with efficient network management systems has been growing. The answer from many equipment manufacturers has been to build and deploy alarm correlation systems described above. These alarms correlation systems are placed between the network and the NOC.

The older (first generation) alarm correlation systems are more domain expert intensive. Here the fault patterns observed by the experts are implemented as rules in an expert system. The information required for building an expert system is readily available (in the form of experts'knowledge).

However, as discussed above, such first generation systems are incomplete due to the nature of telecommunications today. Because of the complexity of code and the number of logs that may be generated in a typical fault scenario (around 5,000 a second) it is almost impossible and improbable that a group of domain experts will catch any significant number of the faults and take necessary proactive measures to prevent a network failure. The problems appear continuously, but the expert never gets the opportunity to completely analyze the scenario prior to the next occurrence. This leads to an incomplete knowledge base of failures and proactive actions by the domain expert.

The newer (next generation) alarm correlation systems have incorporated many software methodologies and concepts to systematically search alarm databases, problem ticket databases, etc. and extract patterns not seen by the domain experts. The next generation alarm correlation solutions employed data mining (DM) techniques to identify and learn patterns (commonly referred to as episode rules in data mining terminology). Analogous to the phase where the fault patterns are extracted from domain experts in traditional systems, DM techniques extract fault patterns from alarm databases. These rules are then passed through system experts to see if any are redundant, or if it is a significant rule. The resulting patterns are then fed in as rules to an expert system.

Several such solutions have been advanced including sophisticated systems that consist of both traditional and non-traditional alarm correlation systems. These includes: (i) the Telecommunications Alarm Sequence Analyzer (TASA) by NOKIA; (ii) ANSWER and ECXpert, two tools created by AT&T; and (iii) IMPACT by GTE.

Many of the current approaches for alarm correlation depend on the expertise of a domain expert to provide the observed network fault patterns. However, as previously discussed, it is not sufficient to depend on domain expertise alone. The rapidly evolving networks continuously alter the existing network topology with the addition of new network elements, new software loads, and network connections. These scenarios pose a serious threat to the expert's knowledge, which to a great extent relies on seeing a pattern over and over again. This opens the field for the utilization of systems that are capable of assisting the domain experts in identifying fault patterns.

It is therefore desirable to have a system for dynamically handling faults in a telecommunications network that is capable of discovering, learning and predicting the recurrent patterns of faults of a network as well as being capable of providing precautionary action. It would be further desirable to have a network alarm correlation system that dynamically and systematically discovers alarm correlation rules that enables root cause analysis, fault prediction and proactive maintenance.

SUMMARY OF THE INVENTION

It is therefore one object of the present invention to provide an improved telecommunications network.

It is another object of the present invention to provide a method and system for identifying fault patterns as they occur in telecommunications network.

It is yet another object of the present invention to provide a method and system for fault prediction and proactive maintenance in a telecommunications network.

The foregoing objects are achieved as is now described. A system for proactive maintenance of a telecommunications network is disclosed. A database is created containing characteristics (parameters) of a plurality of valid logs. These valid logs represent alarms within a network that report status and abnormalities in the network and which have been specifically selected by a network domain expert or administrator from a larger group of logs. The characteristics correspond to a pattern of network fault parameters. The network is monitored for occurrences of a valid log within the telecommunications network. Upon occurrence of a valid log, a fault occurrence is predicted based on an analysis of the valid log and the characteristics found in the database.

In the preferred embodiment, the creation of the database of valid logs is a static function completed by a backtracking algorithm and the network administrators utilizing known operational measurements (OM) and other information. Prediction occurs dynamically once a valid log is detected. Corrective steps are taken and the network administrator is alerted to those steps which may not be sufficient to correct the pending fault.

The above as well as additional objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

Figure 1:
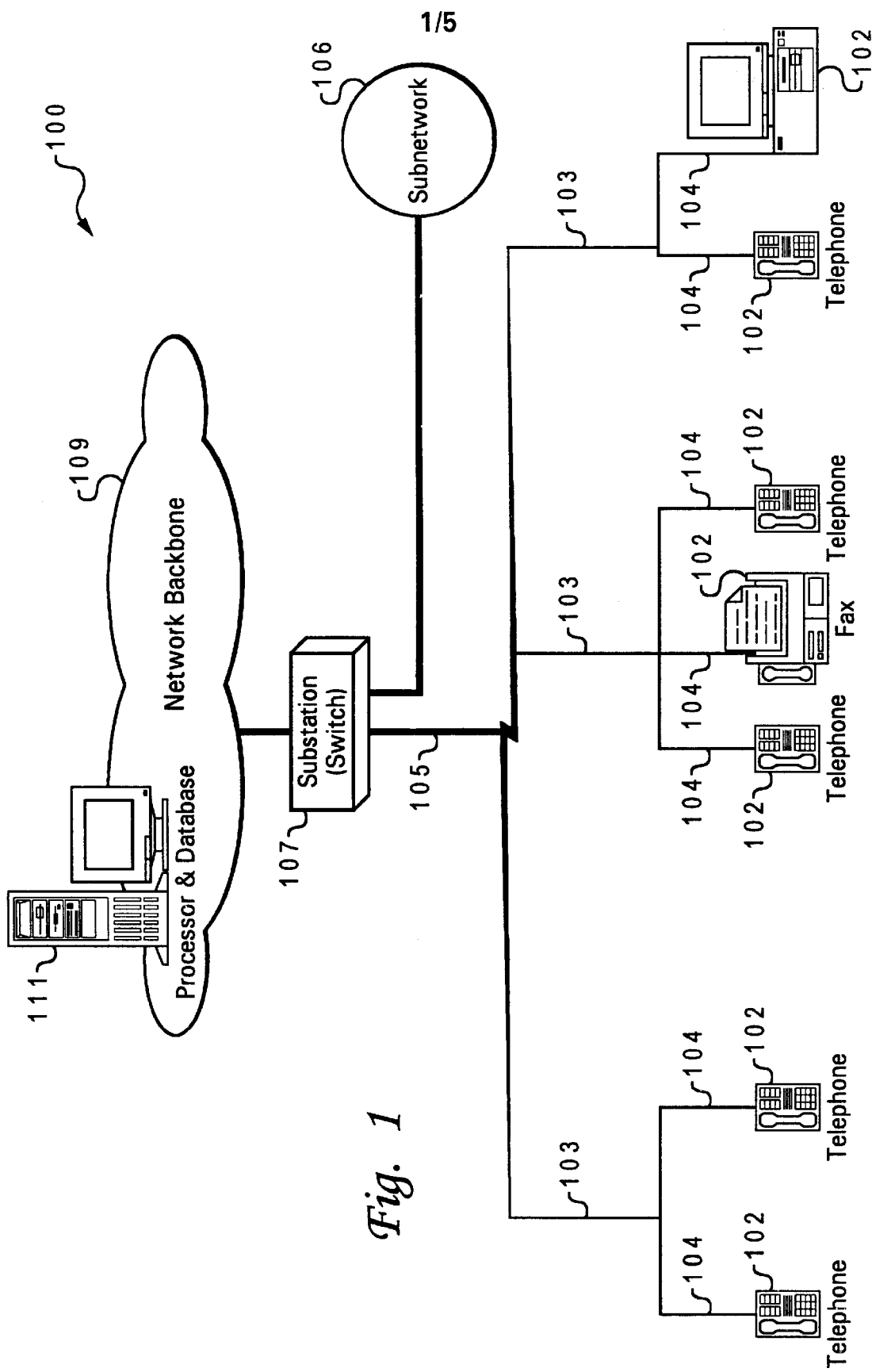
FIG. 1 is a diagram depicting a general telecommunications network in accordance with one embodiment of the present invention.

With reference now to the figures and in particular with reference to FIG. 1, a diagram of a Telecommunications Network (TN) 100 is depicted in which the preferred embodiment of the invention is implemented. TN consists of a number of end users 102 who are connected via links 104. As illustrated, end users 102 may be telephones, faxes, or computer internet connections, etc. A set of links combined together create a link set 103. Link set 103 in turn combines with other link sets 103 to create a route 105 which is a major bus connector from a network substation 107. Network sub-station 107 is connected to a larger network system 109 illustrated by the cloud. Within network system 109 is a data processor and data storage location (database) 111 utilized in the implementation of the invention. Network sub-station 107 and all other connections below it including additional subnetworks 106 represents a local network managed by a local network administrator. In another embodiment of the invention, each substation is equipped with a data processing system with a large data storage capacity for holding the huge amounts of fault data collected during backtracking on the local network and utilized within the invention fault prediction mechanism. This allows for quicker detection of logs and prediction of faults by implementing these mechanisms on the local subsystems. The alternate embodiment (depicted here) allows for the data to be stored at a single location at the main network station where the entire network is monitored by a single superscalar data processing system 111 with a storage location loaded with the respective backtracking and prediction algorithms and storing the required fault data. It is understood that the storage medium/location of the fault data may be a distinct mechanism from the implementing processor.

Figure 2:
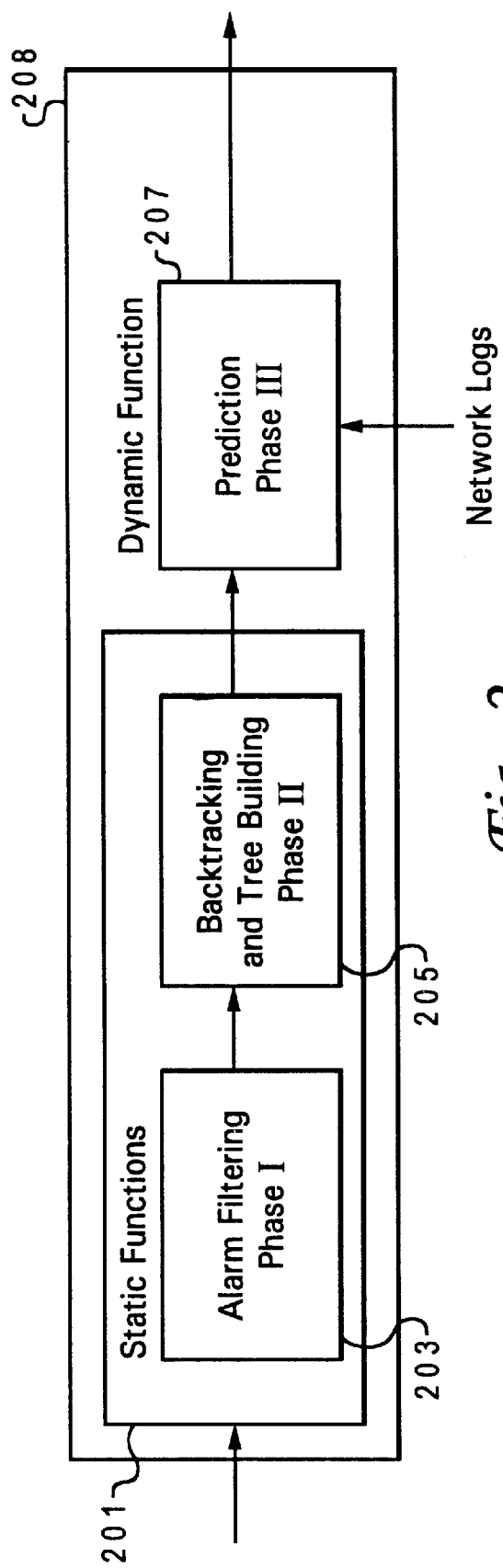
FIG. 2 is a diagram depicting the three functional phases in accordance with the preferred embodiment of the present invention.

The present invention provides a system and method for identifying fault patterns, root cause analysis-prediction, and proactive maintenance in a telecommunications network. The invention (referred to herein as NeFPPS during implementation) comprises of a static (manual) function and a dynamic (real time) function. The first function, the static function, is a training or learning function consisting of two phases. The second function, the dynamic function, is the deployment function consisting of a single phase. This function operates in real time. When executing the deployment function, the second phase of the training function remains active. Thus, the system never stops learning. FIG. 2 depicts these two functional components of the invention. Static functions 201 includes alarm filtering phase 203, and a backtracking and tree building phase 205. Dynamic function 208 has a prediction phase 207. Each phase will be described in detail below. The invention's two functions are implemented within algorithms, namely a backtracking algorithm and a prediction algorithm.

A. STATIC FUNCTION (i) FILTERING

The first static phase illustrated in FIG. 2 involves the filtering out of unrelated logs. During filtering, a list of interesting logs is stored in a data base. A comparison is made of the complete set of logs to this list and any log that does not match this list is filtered out (i.e., removed from the complete set of logs). (In one embodiment, if a particular fault pattern is not identified by the backtracking algorithm, then a check is made to determine if some logs pertaining to the fault have been filtered out instead). The number of log types utilized is often very large and thus the logs are stored within a database of valid logs (i.e., logs determined to be interesting by the network domain expert or administrator.

Typically these logs contain information which would be useful in Identifying potential network failure. All other logs are deemed "uninteresting").

Once the uninteresting logs have been filtered, a second filtering step is undertaken. This is because a particular log may contain "uninteresting" data along with "interesting" data. This second filtering helps to minimize the data fed into the backtracking algorithm. The backtracking algorithm is responsible for removing information related to fault patterns hidden in the valid log types and is discussed in detail below. All unnecessary details are removed from the valid logs. The result is a smaller data set per log. The invention contemplates that both filtering steps may be completed in a single step.

As utilized in NeFPPS, the backtracking algorithm (comparable to episode discovery of data mining) covers the two static phases of the invention. A key component of the static function involves discovering fault episodes/occurrences. The invention utilizes automated data mining. Experts therefore have to verify the "interestingness" of the discovered episode. During episode discovery, the invention allows a network administrator to manually add episode rules to the data base.

The input to NeFPPS is raw data logs (D-logs) which are typically of immense size. For normal operation conditions, the number of logs seen on a node may be about 5 giga bytes. Of these input logs, a fair amount of data can be classified outright as not related to the immediate task of fault prediction. Such data is termed "uninteresting" in the art. By filtering out the uninteresting as well as some parameters in a particular interesting log, the amount of data fed to the next phase is reduced dramatically. Also, it is understood that all logs do not follow one common format. For example, one log may contain link state, failed reason, information while another log contains route state information. It is important here to note that failure type is generic although given different names in different systems. The invention works with the type of failure, not its identifying name.

(ii) BACKTRACKING

The second static phase is the backtracking and tree building phase. The data mining algorithms of the present invention, NeFPPS's backtracking algorithm, takes the unique characteristics of telecommunications into consideration in order to harness the full capability of the underlying pattern discovery algorithm. It integrates a number of aspects that are unique to telecommunications, thus providing capabilities to identify patterns that would otherwise have been missed by TASA. Several of these aspects are discussed later.

The backtracking functionality is essentially a combination of a data mining technique modified to address the telecommunications domain and a modified decision tree to hold the discovered data patterns. This takes into consideration the defined relationships of internal parameters of the previous log and the internal parameters of the next log received from the network.

The backtracking algorithm provides a new semi-automated data mining technique independent of frequency restrictions. The algorithm contains an enhanced decision tree with consolidated episodes which are more precise in root cause analysis. It also includes other factors wherein it discovers more fault patterns, thus increasing the ability to prevent many would be faults. It predicts the probability of the next fault in relation to an occurred fault, and it provides the maintenance action required to avert the probable fault as well as the existing fault.

An illustration of the backtracking algorithm with reformatted logs for alarm correlation is now presented along with an explanation.

For a given set such that where n is the number of logs, a generalized log space =0 is defined. For this algorithm, D: represents re-formatted Log $D(D_i, N_j, R_k, T_l)$ Where $1 \leq i \leq I$, I is the highest severity and S represents severity of Log (fault).

$1 \leq j \leq J$, J is the total number of network elements and $N_j$ represents a network element.

$1 \leq k \leq K$, K is the highest level of network topology hierarchy tree and $R_k$ defines a network element's network topology relationship between $R_{k-1}$ and $R_k$.

$1 \leq l \leq \infty$, $T_l$ is time of a fault occurrence and $T_{l-1} \leq T_l \leq T_{l+1}$.

For a given set such that $D_1, D_2, \ldots, D_i, \ldots D_n$ when n is the number of logs, we define a generalized log space $L_n = (D_1, D_2, \ldots, D_i, \ldots, D_n)$.

For $1 \leq i < j \leq n$, let

1. Event($D_i$) be the time that log $D_i$ occurred
2. E_name ($D_i$) be the network element name that a fault occurred
3. Rel_bool ($D_i$, $D_j$) be a boolean that represents log relationship between log $D_i$ and $D_j$. Rel_bool ($D_i$, $D_j$)='T' when log $D_i$ and log $D_j$ are related in the pre-defined log relationship table, otherwise Rel_bool ($D_i$, $D_j$)='F'.
4. Net_bool ($D_i$, $D_j$) be a boolean that represents network element hierarchy relationship between E_name ($D_i$) and E_name ($D_j$). Net_boool ($D_i$, $D_j$)='T' when E_name ($D_i$) is a parent node of E_name ($D_j$) in the network element hierarchy tree.
5. $R(L_n) = \{D_i, D_j | Event(D_j) - Event(D_i) \leq thresh\_hold$, Rel_bool($D_i$, $D_j$) and Net_bool ($D_i$, $D_j$), $1 \leq i < j \leq n\}$ be the set of alarms that fault pattern exists in ascending order of logs in a set.

As explained above, the first static phase reduces the amount of uninteresting data. The resultant data set of interesting logs still qualifies as a large set of data. The invention implements an efficient method to accomplish this task. The invention places no restriction on expanding the set of interesting logs. Neither is there a restriction in removing a "was interesting" log, into the uninteresting category.

Knowledge Discovery in Databases (KDD), another term utilized to describe data mining, is the application of systematic methods to extract the hidden patterns from these databases. The output of the first phase is a collection of logs that have a time relationship to each other. However, this alone does not provide an insight as to what fault patterns exist hidden within these data, or why the fault patterns occurred. The clues to piece the puzzle together lies in the parameters of these different logs.

NeFPPS implements an approach to find fault patterns. The approach utilizes semi-automatic data mining techniques to successfully extract data from large databases. The backtracking algorithm extracts all possible episode rules based on these moderately loose defined constraints. The majority of the restrictions in NeFPPS are in the form of network topology relationships.

Figure 3:
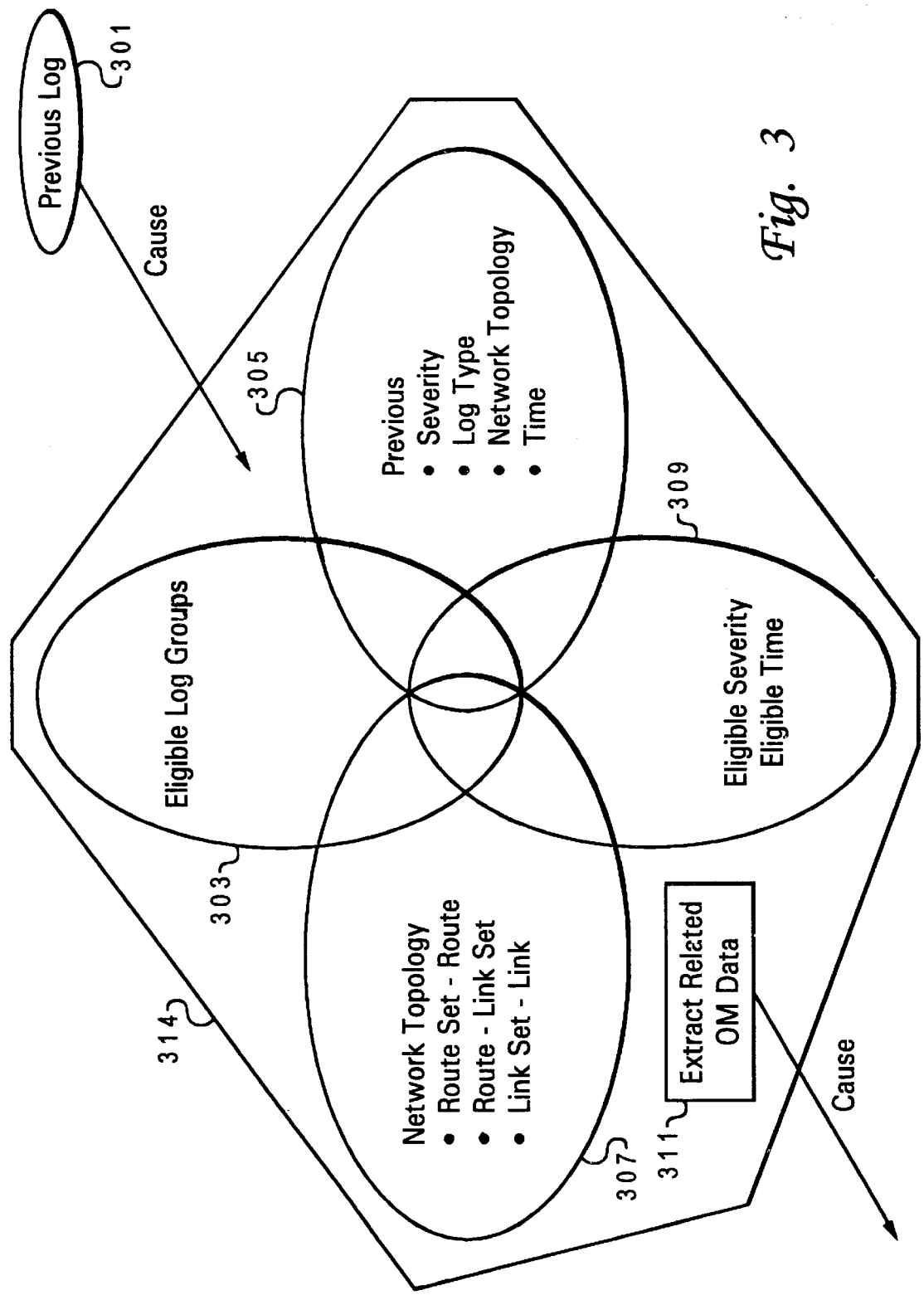
FIG. 3 is a diagram illustrating the various fault parameters utilized in backtracking in accordance with one embodiment of the present invention.

FIG. 3 depicts the parameters (episode rules) utilized in the backtracking algorithm. An initial previous log 301 is identified. Previous log 301 represents a severe log in a network. The algorithm seeks to identify the plurality of associated factors once previous log 301 is identified. These factors include: eligible log groups 303, which locates the general group to which previous log 301 and precursor 314 to that previous log 301 belongs including an analysis of the severity, log type, network topology and time relationships 305 to previous log 301; network topology 307 which plays an important role in determining the network relationship to previous log 301 and the possible transmission within the network from route set to route, route to link set, and link set to link or vice versa; and eligible severity 309 which tells the category of severity cause 301 has been given (severity is determined by the network domain expert and backtracking algorithm which determines which faults are more likely to lead to a network failure). Since the verification is completed to indicate that this is the cause of previous log 301 all OM data 311 are then extracted. These parameters are all interlinked and are determined during backtracking and later utilized in the prediction algorithm.

The embodiment presents the concept of mapping a fault back to a cause based on similar patterns to a prior log. A known fault pattern is identified and then utilized to predict future patterns when a cause/log is encountered. The circles depicted in FIG. 3 represent all eligible log parameters utilized to predict a potential fault in one illustrative embodiment. A linear processing is involved which is based on severity, log types and current network behavior. For example, some faults occur for single link failure, others only for multiple link failure. During the static phases of the invention, network administrators decide which faults are critical. These serve as input to the backtracking algorithms.

The time a fault occurs is an important parameter in the process of the invention as discussed below. The OM data tells how the network is behaving at a particular time. Also, some fault patterns are limited/correlated to a certain time period (for example, the fault pattern may only occur between 2:00 pm and 2:30 pm). The OM data are similar types (number of calls dropped per hour, etc.). The network topology relationship helps to determine which links a failure belongs to and in ensuring that a log is similar to a previous log.

NeFFPS defines the log relationships (how the logs would relate to each other logically). For example, logs related to link level can not have a direct relationship to a route level log. Logically it needs to be related to the next level, which is linkset related logs. So instead of strictly identifying a log pattern (i.e. talking to domain experts and extracting their knowledge), the invention identifies all logs that have a relationship to each level. This aids in identifying a comprehensive list of patterns in a telecommunications domain and increases the efficiency of episode discovery.

NeFPPS is designed to learn a pattern that occurs only once. In telecommunications, if a particular fault pattern happens once, then it is certainly reproducible. Since NeFPPS does not heavily rely on frequency of an episode, it learns a new pattern with the pattern's first appearance. Thus, the next time the episode appears the system will be in a position to predict rather than wait until some more occurrences to validate the pattern.

In the preferred embodiment, NeFPPS consolidates similar patterns. It is contemplated that any type of log from any company may be utilized within the invention. It is important to note that different networks exhibit different parameters with the same patterns; thus a range is provided within the algorithm within which all parameters may be consolidated. In the referred embodiment, range refers to the number of traffic per link. In another embodiment, range corresponds to the amount of leeway given in the time of occurrence of a log.

Through an efficient consolidation process, the number of similar episodes can be reduced to a single representative episode within a given range. Consolidation provides an efficient mechanism for the prediction phase to access the data extracted from backtracking algorithm.

The following steps are utilized within the consolidating function of the invention:

1. Identify similar episodes—The logs should be exactly the same in all those episodes; and
2. For every parameter in each log type, set up a bucket for consolidation.

In the preferred embodiment, NeFPPS, unlike the common data mining approach of discovering episode and association rules, does not have episode and association rules together. Instead NeFPPS only consists of episode rules.

Figure 4:
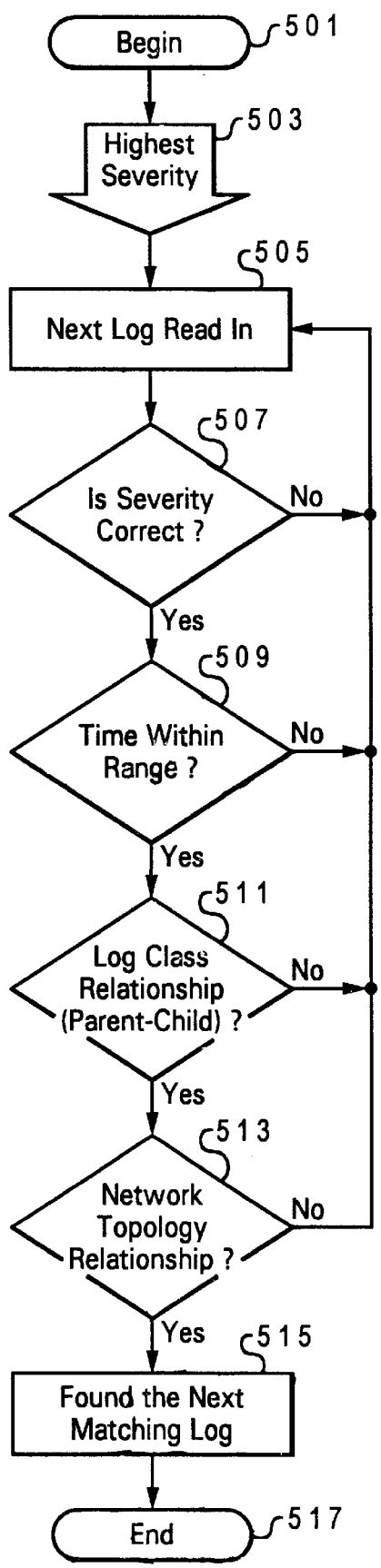
FIG. 4 is a flow chart illustrating the backtracking process in accordance with one embodiment of the present invention.

A flow chart of the backtracking algorithm is now presented. FIG. 4 depicts the process which begins (step 501) by identifying the highest severity (step 503). The next log is read into the process (step 505) and a check is made to determine if the log's severity is correct (step 507). For this illustration, a log's severity is correct when it matches the highest severity identified at that point. If the severity is not correct, then the process returns to read in the next log and another check of severity is made. If, however, the severity is correct, a check is made to determine if the time is within a selected range (step 509). A sample range is presented above (2:00 pm–2:30pm). The range is determined by a network domain expert or administrator and is typically several minutes long. If the time is not within the selected range, then the process again returns to read in the next log. If the time is within the selected range, a determination of the log class relationship is made (step 511). The log class is a set of characteristics which similar logs exhibit. It may be a subset of the log type. The determination includes finding out whether or not the log exhibits a "parent-child" characteristics (for example, a log pertaining to a link set(comprised of multiple links) and a log pertaining to a link exhibits a parent-child relationship as linkset-link relationship). If the parent-child relationship is not present, the next log is read. If the relationship is present, a final check is made to determine if there is a relationship (i.e similarity) in the network topology of the logs (step 513). If the network topology relationship exists, then the log is a matching log (step 515) and the process ends (step 517).

The above process represents one embodiment of the processing steps of the backtracking algorithm. Various other implementations are possible. For example, it is understood that the utilization of time as the range is only for illustrative purposes as discussed above. A variety of applicable range factors may be utilized, such as location. Also, the processing of the algorithm is understood to be a continuous process until all possible interesting logs have been identified and mapped.

B. DYNAMIC FUNCTION

In the dynamic function, NeFPPS contains two distinct phases:
  (i) the training phase in which the decision tree is constructed/built based on:
    a. customer d-logs,
    b. domain knowledge,
    c. documentation,
    d. some fault patterns which were unknown to domain experts, and
    e. any new patterns identified during the deployed stage; and
  (ii) the application/prediction phase wherein the dynamic and self-learning system learns on its own while deployed in the field.

(i) PREDICTION

Prediction is the ability of the system to be able to foretell a fault before it really happens. The prediction phase aides domain experts in understanding what new fault patterns are introduced as a result of a new network load. Proactive measures are added to the newly discovered episode patterns and include analyzing the data in the databases or simply querying the NOC staff. These measures yield solutions to prevent minor faults propagating to major faults.

The prediction algorithm first determines the probability of the next fault, and implements a proactive maintenance action to avert it. During its determining step the prediction function:

1. Identifies the just seen log—This log could be related to (i) the log that was seen earlier, (ii) the first log of a series fault about to happen, or (iii) the first and the last that gets corrected by the network;
2. Based on the log type, finds all episodes that contain this log. (The log type may be logs pertaining to signalling of network, hardware or software related logs, telephony related logs, etc.); and
3. Extracts data corresponding to the parameters present in the just seen log with the same log type seen in the episodes from the backtracking and tree building phase. The following parameters are extracted:
   a. Log type—According to the log type, the matching episodes are selected from consolidated data.
   b. Traffic—extract the traffic for that link, linkset, or corresponding network aspect. The corresponding aspect is related to the log type. For example a link failure log always pertains to a link. Therefore extract link data.
   c. Errors—extract the number of errors, in the same manner as given above.
   d. Time—based on current time, comparisons can be made on previous log in the episode (child) as well as approximate time for the next log.
   e. Capacity—how much of capacity is in utilization, again depends on the network aspect.
   f. Congestion—extract the current congestion. This could be utilized to compare with the previous log's (child) congestion and calculate how long it has been that way. By looking at the consolidated data, it will provide the previous time ranges for episodes with congestion levels.
   g. Number of signaling available—Depending on the log type, extract the proper signaling information. For example, this contains the number of links available in that linkset. If there were 3 links on a particular linkset, and 2 links are already out of service, then the value of this parameter will be one. The data table can be updated with previously seen network element failure or restoration messages.

The prediction algorithm works by combining several kinds of data obtained from the network. NeFPPS takes the output of the backtracking algorithm to understand the sequence of logs seen from the network. This data is utilized by the prediction algorithm which combines it along with other kinds of information such as the network configuration information, the traffic rate, and the states of different elements of the network, etc. The prediction function is then implemented as:

$$fn(logtype_{name}, traffic_{value}, errors_{number}, time, capacity_{value}, congestion_{value}, signaling\ availability_{value}, other)$$

NeFPPS utilizes its built-in knowledge to decipher the current state of the network and from this knowledge is able to foresee if a event of higher magnitude is about to happen. Thus, NeFPPS is an expert system with certain fault scenarios already built in to the system. Another important aspect of NeFPPS is its ability to enhance/update its knowledge base with the events that are observed by it. This is accomplished by keeping a history of fault conditions over a period of time. If any new fault scenario is observed repeatedly for a given period of time, the new fault scenario is entered in the knowledge database.

As discussed in the preceding paragraphs, the prediction algorithm is a function of a number of factors. It takes the output of the backtracking algorithm (which determines the sequence of events as well as the frequency of such events), the rate of traffic carried by the network (obtained by the operational measurements), the states of different network elements and the configuration details. All these factors put together determine a certain condition (or health) of the network. This pattern is then matched against some of the known patterns built into the expert system. If a matching pattern is seen that shows a trend towards a major or critical error condition or fault, then the algorithm outputs a message to inform the network administrator of the potential fault. The algorithm also suggests a corrective action that can be taken to avoid such a situation.

Figure 5:
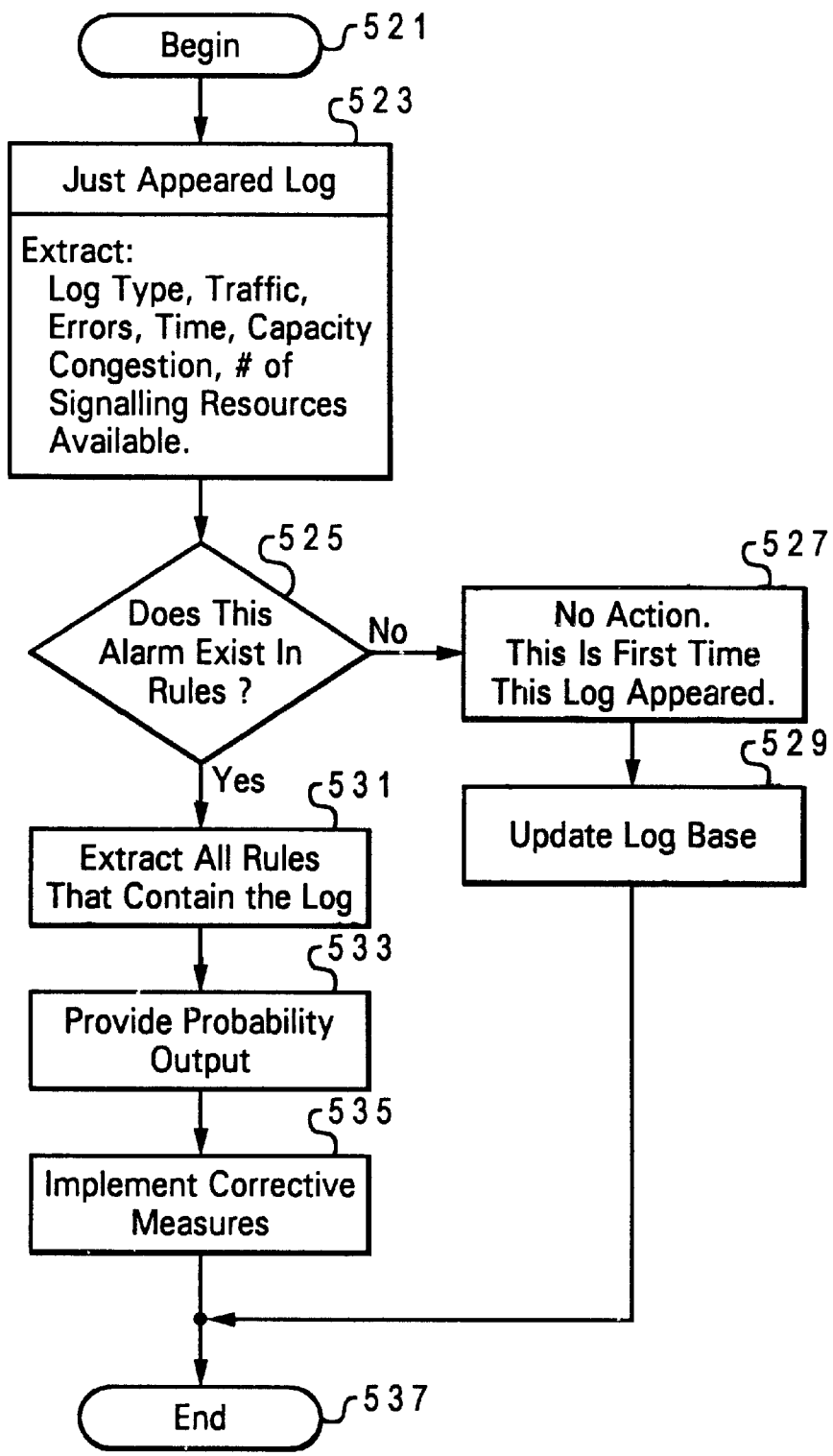
FIG. 5 is a flow chart illustrating the prediction process in accordance with one embodiment of the present invention.

A flow chart of one implementation of the prediction algorithm is now presented. FIG. 5 depicts the process involved which begins (step 521) with an extraction process on a just appeared log (step 523). This process extracts relevant information utilized during the prediction analysis including log type, traffic, errors, time of occurrence, network capacity, congestion, and number of signalling resources available. A check is then made to determine if the alarm exists in the known rules (step 525). If the alarm does not exist in the known rules, the prediction process takes no action (step 527) but updates its log base (step 529) with information of this new log type. When the alarm is present in the rules, the process extracts all the rules that contain the log (step 531). The process then provides a probability output (step 533) corresponding to the probability the log will lead to a severe fault. Finally, the process provides corrective measures (step 535) to attempt to counter possible occurrence of a severe fault. Then the process ends (step 537).

In the preferred embodiment the process takes into consideration the varying numbers of links and linksets in the switch. The corresponding tables from the switch are read and the traffic carried by the links are calculated. Another method of calculating the traffic per link is to pull OM information for the corresponding links. This yields a more accurate calculation of the average traffic per link.

NeFPPS incorporates proactive maintenance information that will be extremely useful when domain experts need to find solutions to network faults as they unfold in quick succession (about 5,000 logs a minute during a severe fault).

The prediction function provides a number of benefits. Namely, it allows for a highly reliable network, which is free of faults, and can detect and correct faults autonomously. Where it is not fault intolerant, the invention provides a tool or a vehicle that communicates to the operators the current health of the network and a tool that makes suggestions to prevent any major emergencies. With a function such as the one provided by NeFPPS, an operator benefits by reduced cost to maintain the network and by having to deploy fewer technicians to monitor the system as well as reduced cost due to fewer outages.

Systems such as NeFPPS also bring in cost savings to service providers in terms of a reduced staff to man NOC, a tremendous cost savings, especially when the network reliability is not compromised. As a result of utilizing the capabilities proposed in NeFPPS, networks will be highly reliable and easy to manage resulting in increased customer satisfaction as well as reduced cost of maintenance of the network.

While the invention has been particularly shown and described with reference to a preferred embodiment, it will be understood by those skilled in the art that various changes in form and detail may be made therein without departing from the spirit and scope of the invention.

What is claimed is:

1. A system for proactive maintenance of a telecommunications network, said system comprising:

means for creating a database of characteristics of a plurality of valid logs, said valid logs being alarms within a network which report status and abnormalities in the network and which have been specifically selected by a network domain expert or administrator from a larger group of logs, and said characteristics corresponding to a pattern of network fault parameters;

means for monitoring an occurrence of a valid log within said telecommunications network; and means for predicting an occurrence of a fault within said telecommunications network based on said valid log and said characteristics.

2. The system of claim 1, said creating means including:

means for filtering out a log type from a plurality of log types based on a determination by a network administrator that said log type is not important;

means for removing unnecessary characteristic from said valid log type; and means for consolidating similar log types within a predetermined range to create a set of single representative log types.

3. The system of claim 1, said creating means further includes means for updating said database.

4. The system of claim 3, said updating means includes:

means for adding new valid log types; and means for removing prior valid log types which are determined to be no longer valid.

5. The system of claim 3, said recognizing means includes means for determining that said log occurrence is one of said valid log types.

6. The system of claim 1, wherein said monitoring means includes:

means for recognizing a log occurrence on said network;

means for determining a location in said network of said log occurrence;

means for recording a time of said log occurrence; and means for recording current network parameters along with said time and location of said log occurrence.

7. The system of claim 1, said predicting means includes:

means for analyzing said valid log to determine its characteristics;

means for mapping said characteristics along with a plurality of factors including eligible log groups, network topology, and patterns of prior logs;

means for comparing a result of said mapping with known fault patterns in said database;

means for determining the evolution of said log into a particular fault; and means for responding to said determining of a particular fault.

8. The system of claim 7, said comparing means includes:

means for backtracking to yield an output log data;

means for combining said output log data with a plurality of network parameters including traffic rate, network configuration, and current state of network elements; and means for analyzing a result of said combining means to determine if a matching pattern indicates a set of factors leading to a predetermined fault.

9. The system of claim 8, said backtracking means comprising:

means for linearly searching through said database for a first corresponding log;

means for extracting a plurality of log parameters from said first corresponding log, said parameters including: log type, time of occurrence and network topology;

means for linearly searching through said database for a next corresponding log within a predetermined time period from said first corresponding log;

means for comparing a pattern of next corresponding log to said first corresponding log;

means for substituting said plurality of parameters of said first corresponding log with a plurality of parameters from said next corresponding log; and means for extracting operational measurement data utilized in said comparing means from said next corresponding log.

10. The system of claim 7, wherein said responding means further includes:

means for informing a network administrator or system personnel of a probable occurrence of said particular fault.

11. The system of claim 7, said responding means further incudes:

means for implementing fault corrective measures in said network to prevent the occurrence of said particular fault.

12. The system of claim 1, said prediction means further includes:

means for dynamically updating said database by incorporating new log fault patterns observed into said database of log patterns.

13. A method for proactive maintenance of a telecommunications network, said method comprising the steps of:

creating a database of characteristics of a plurality of valid logs, said valid logs being alarms within a network which report status and abnormalities in the network and which have been specifically selected by a network domain expert or administrator from a larger group of logs, and said characteristics corresponding to a pattern of network fault parameters;

monitoring an occurrence of a valid log within said telecommunications network; and predicting an occurrence of a fault in said telecommunications network based on said valid log and said characteristics.

14. The method of claim 13, said creating step including the steps of:

filtering out a log type from a plurality of log types based on a determination by a network administrator that said log type is not important;

removing unnecessary characteristic from said valid log type; and consolidating similar log types within a predetermined range to create a set of single representative log types.

15. The method of claim 13, said creating step further includes the step of updating said database.

16. The method of claim 15, said updating step includes the steps of:
adding new valid log types; and
removing prior valid log types which are determined to be no longer valid.

17. The method of claim 15, said recognizing step includes the step of determining that said log occurrence is one of said valid log types.

18. The method of claim 13, wherein said monitoring step includes the steps of:
recognizing a log occurrence on said network;
determining a location in said network of said log occurrence;
recording a time of said log occurrence; and
recording current network parameters along with said time and location of said log occurrence.

19. The method of claim 13, said predicting step includes the steps of:
analyzing said valid log to determine its characteristics;
mapping said characteristics along with a plurality of factors including eligible log groups, network topology, and patterns of prior logs;
comparing a result of said mapping with known fault patterns in said database;
determining the evolution of said log into a particular fault; and
responding to said determining of a particular fault.

20. The method of claim 19, said comparing step includes the steps of:
backtracking to yield an output log data;
combining said output log data with a plurality of network parameters including traffic rate, network configuration, and current state of network elements; and
analyzing a result of said combining means to determine if a matching pattern indicates a set of factors leading to a predetermined fault.

21. The method of claim 20, said backtracking step comprising the steps of:
linearly searching through said database for a first corresponding log;
extracting a plurality of log parameters from said first corresponding log, said parameters including: log type, time of occurrence and network topology;
linearly searching through said database for a next corresponding log within a predetermined time period from said first corresponding log;
comparing a pattern of next corresponding log to said first corresponding log;
substituting said plurality of parameters of said first corresponding log with a plurality of parameters from said next corresponding log; and
extracting operational measurement data utilized in said comparing means from said next corresponding log.

22. The method of claim 19, wherein said responding step further includes the step of informing a network administrator or system personnel of a probable occurrence of said particular fault.

23. The method of claim 19, said responding step further incudes the step of implementing fault corrective measures in said network to prevent the occurrence of said particular fault.

24. The method of claim 13, said prediction step further includes the step of dynamically updating said database by incorporating new log fault patterns observed into said database of log patterns.

25. A system for proactive prevention of faults in a telecommunications network comprising:
a data storage medium;
a processor coupled to said telecommunications network and capable of accessing said data storage medium, said processor containing a set of algorithm for implementing network related functions including:
means for populating said data storage medium with a plurality of valid log patterns corresponding to a plurality of network fault prediction parameters, said valid logs being alarms within a network which report status and abnormalities in the network and which have been specifically selected by a network domain expert or administrator from a larger group of logs;
means for monitoring an occurrence of a valid log within said telecommunications network; and
means for predicting an occurrence of a fault in said telecommunications network based on said valid log and said valid log patterns in said database.

* * * * *